UNITED STATES PATENT OFFICE.

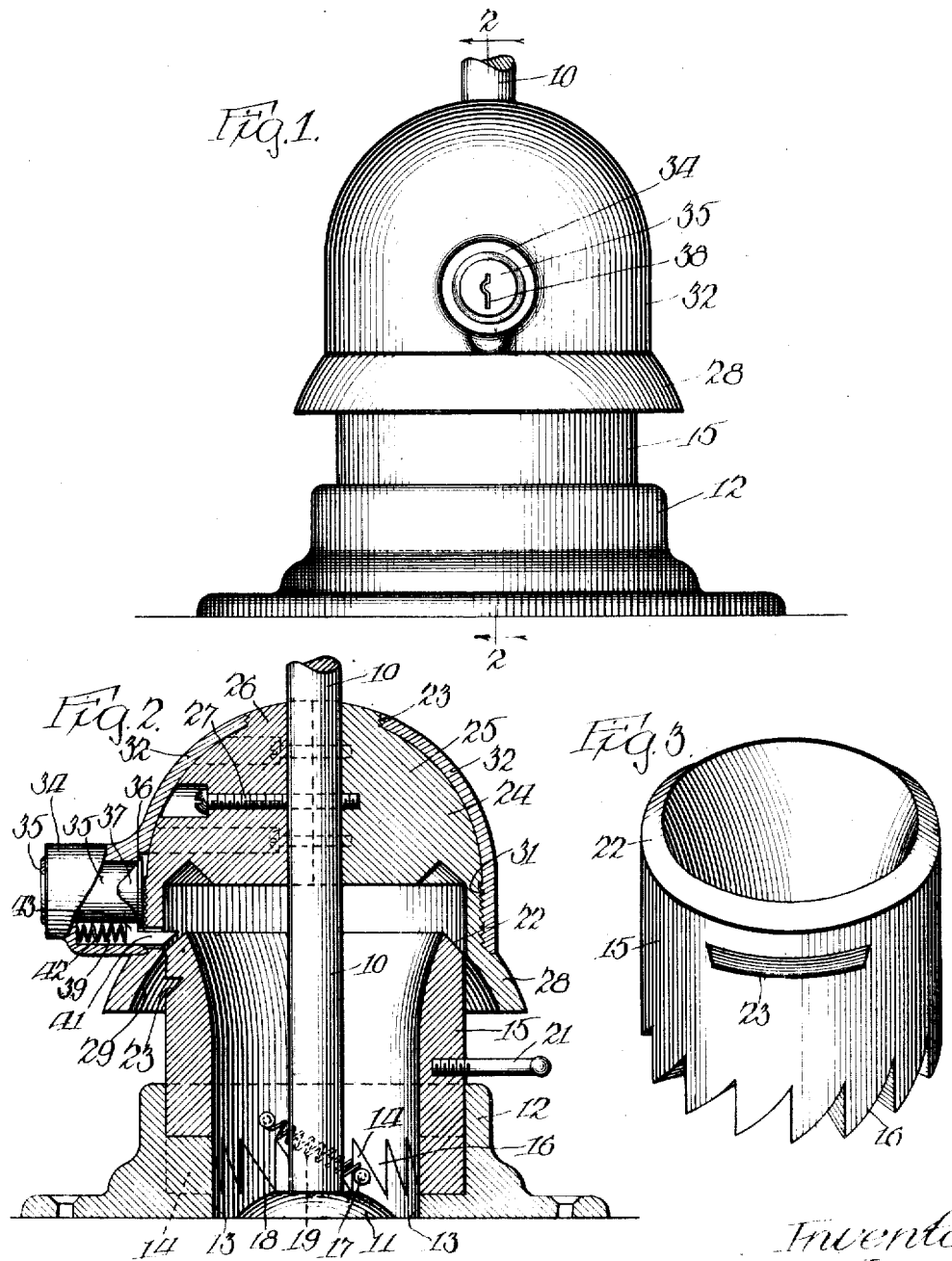

GOTTHARDT KOCH, OF CHICAGO, ILLINOIS.

AUTOMOBILE-LOCK.

1,267,557.      Specification of Letters Patent.      Patented May 28, 1918.

Application filed November 12, 1917. Serial No. 201,415.

*To all whom it may concern:*

Be it known that I, GOTTHARDT KOCH, a subject of the Emperor of Germany, residing at Chicago, in the county of Cook and State of Illinois, have invented certain new and useful Improvements in Automobile-Locks, of which the following is a specification.

My invention relates to automobile locks and has for its primary object the provision of an improved lock whereby the shift lever controlling the transmission gearing in a motor car may be locked against movement. More particularly my invention relates to a lock for that type of automobile shift levers normally positioned in the middle of the flooring of the automobile and comprising a rod fixed centrally in a ball, the ball being mounted in a socket and providing a universal pivot for the rod. A further object of my invention is to provide an improved form of such a lock wherein the cost of manufacture is reduced and the construction simplified.

With the above and other objects in view this invention consists substantially in the combination, arrangement and construction of parts all as hereinafter described, shown in the accompanying drawings which form a part of this specification and illustrate the preferred embodiment of my invention, and more particularly set forth in the subjoined claims.

In the drawings—

Figure 1 is a front elevation of my invention showing at the upper extremity, broken away, a fragment of the shift lever.

Fig. 2 is a vertical section taken substantially on line 2—2 of Fig. 1.

Fig. 3 is a view in perspective of a plug forming part of the invention.

Reference numeral 10 designates the shift lever of an automobile, the upper end thereof being broken away in the drawings. The lever 10 is fixedly and centrally mounted in a ball 11 which is mounted for rotary movement in a spherical bearing not shown. Fastened in any suitable manner to the floor of an automobile is a floor socket 12 which is centrally pierced at its lower end as at 13 to permit the seating or removal of the ball 11. The upper end of the floor socket 12 is hollowed out to form a plug socket of larger diameter than the pierced hole 13, and at the bottom of this larger socket portion a number of serrations 14 are provided pointing upwardly and forming in reality a plurality of cams. Fitting into the upper end of the floor socket 12 is a plug 15, the lower end of which is formed with teeth 16 which are complementary to the serrations 14. Between a stud 17 on the floor socket and a stud 18 on the inner surface of the plug 15 is tensed a spring 19 which tends to hold the teeth 16 fully seated upon the serrations 14; in other words the spring 19 normally holds plug 15 fully seated in the bottom of the socket. As a means for rotating the plug 15 a handle 21 is screwed into it and extends laterally from the plug. By a counter-clockwise movement of the handle 21 the plug may be made to rise upon the serrations 14. The upper end of plug 15 is chamfered on its outer end as at 22 and just below its upper end the plug is provided with a horizontally elongated latch notch 23.

Spaced somewhat above the floor socket 12 is a hood generally indicated at 24 and comprising complementary halves 25 and 26 which are secured together about the rod 10 by means of the screws shown in dotted line in Fig. 2, the hollow hood being fixed centrally about the rod 10 by means of a screw 27 which passes through both halves of the hood and the rod as well. In order to prevent the upper end of the plug 15 from being exposed when the device is unlocked for free movement of the shift lever 10 the lower end of the hood is formed with a cape 28 having a substantially spherical internal surface 29, which, when the rod 10 is oscillated, just clears the chamfered edge 22 of the plug. The hood 24 is externally screw-threaded as at 31 and carries a cap 32 internally screw-threaded for engagement with the threads 31. If desired the upper ends of the cap and hood may be likewise screw-threaded together as at 33.

A boss 34 is formed upon the cap 32 and extends substantially horizontally from the surface thereof. Within this boss is mounted any suitable form of cylindrical lock 35 provided at its inner end with a disk 36 carrying a latch cam 37 which protrudes toward the exterior of the mechanism from the disk 36. By insertion of a key in the key-hole 38 the disk 36 and cam 37 may be rotated. Slidably mounted in a horizontally disposed slot 39 in the cap 32 is a latch 41. To form the slot 39 complementary slots in the cap 32 and hood 25 are brought into alinement at the point where the cap becomes seated on the screw threads 31 of the hood. The slot 39 thus formed is closed at its outer end by the metal forming the cap, while at its inner end it opens into the interior of the hood 25. The latch 41 is chamfered at its inner end, the latter protruding normally into the interior of the hood, a spring 42 constantly pressing the latch inwardly. An upturned finger 43 is formed on the outer end of the latch and overlaps the outer surface of disk 36 and cam 37, it being understood that at each of its ends the cam 37 has its face merged with the outer face of disk 36. By rotation of disk 36 and cam 37 the finger 43 is caused to ride outwardly upon the surface of the cam, thus retracting the latch 41 from the interior of the hood. The hollow plug 15 is interiorly flared at its upper end to permit the necessary oscillatory movements of rod 10, and when the parts are in the unlocked position (illustrated in Fig. 2) the hood and cap oscillate with the rod while floor socket 12 and plug 15 remain as shown.

In the operation of my invention, and considering the parts as positioned in their unlocked relation according to Fig. 2, the operator, desiring to lock the lever 10 against movement, grasps handle 21 and moves it in a counter-clockwise direction—viewing the device from the top. The plug 15 rises upon the serrations 14; but before the lower ends of the teeth 16 are elevated to the top of serrations 14 latch 41, retracted during the rise of the plug, snaps into engagement with the latch notch 23. Because of the closely fitting telescopic connection between the upper end of the plug and the hood 24 and the lower end of the plug and the floor socket 12 the rod 10 is now locked against movement. It will be noted that the spring 19 instead of extending vertically or horizontally is inclined at an angle of substantially 45° with respect to the vertical or the horizontal, so that it tends always to move plug 15 both downwardly and in a clockwise direction as viewed from above. In order to unlock the shift lever 10 the operator inserts a key in the lock 35 and rotates cam 37. This causes retraction of latch 41 from notch 23 permitting spring 19 to draw plug 15 into its lower position, as shown in Fig. 2, in which position the upper chamfered end 22 of the plug is sufficiently depressed to permit the cape 28 to swing above it. It will be noted that the cap 32 covers the slotted ends of the screws which hold the two halves of the hood together as well as that of the screw 37 which fixes the hood upon the lever 10; and it will be further noted that by reason of the normal engagement of latch 41 with that part of slot 39 formed in the hood it is impossible, without use of a key, to unthread cap 32 from hood 24. Obviously floor socket 12 may be fastened to the deck of the car body or to any suitable frame, not shown, in which the ball 11 is supported.

While I have illustrated and described the preferred embodiment of my invention it is obvious that one skilled in the art may make modifications thereof without departing from the spirit of the invention. I wish therefore not to be restricted to the precise embodiment shown except in so far as the same is limited in the appended claims.

I claim:

1. The combination with an oscillatory shift lever of a socket fixed with relation to the fulcrum for the lever, a hollow hood fixed upon said lever in spaced relation to the socket and a plug fitting said socket and movable into closely fitting relation with said hood, said plug being of sufficient length to engage both the socket and the hood simultaneously.

2. The combination with an oscillatory shift lever of a socket fixed with relation to the fulcrum for the lever, a hollow hood fixed upon said lever in spaced relation to the socket, a plug fitting said socket and movable into closely fitting relation with said hood, and means for locking the plug to the hood, said plug being of sufficient length to engage both the hood and the socket simultaneously.

3. The combination with a shift lever of a socket fixed with relation to the fulcrum for said lever, said socket being formed with upwardly extending cams, a plug closely fitting said socket and formed with cams complementary to those upon said socket, a hollow hood fixed upon the lever in spaced relation to said socket, the upper end of said plug being formed to fit closely within the hood and mechanism for locking the plug in the hood, said plug being of such length that when fully seated in the socket it clears the hood and when locked in the hood it engages both the hood and socket.

4. The combination with a shift lever of a socket fixed with relation to the fulcrum for said lever, upwardly extending serrations formed at the bottom of the upwardly opening hollow portion of said socket, a plug closely fitting the socket and formed at its lower end with teeth complementary to said serrations, a tension spring fixed at one end to the socket and at its opposite end to the plug, a hood fixedly mounted on the lever in spaced relation to the socket and recessed at its lower end to fit closely about the upper end of said plug, a handle for rotating the socket, and mechanism for locking the plug against movement when its upper end is inserted in the hood, said plug being of sufficient length to engage the socket and hood simultaneously.

5. The combination with a universally pivoted shift lever of a socket surrounding the lever and fixed in relation to the fulcrum for the lever, the open end of said socket extending upwardly, a hollow plug surrounding the lever and closely fitting the socket, a hood fixed upon the lever and having a downwardly opening recess formed to fit closely about the upper end of said plug, a latch mounted in the hood and normally protruding into said recess, means for elevating the plug into engagement with the socket, said plug being formed near its upper end with a latch notch positioned to receive said latch, and a key-operated lock for withdrawing the latch from said notch; said plug being of such length that in lower position it clears the hood while in upper position it closely engages both the hood and the socket.

6. The combination with a pivotally mounted shift lever of a socket fixed with relation to the fulcrum for said lever, a plug closely fitting said socket and movable longitudinally of the lever, a recessed hood fixed upon the lever and adapted to fit closely about the upper end of said plug when the plug is moved outwardly of the socket, a cap screw-threaded into engagement with the hood, there being a horizontal slot formed in the hood and cap and opening into said recess, a latch notch in the plug positioned to aline with said slot during the elevated position of the plug, a latch slidably mounted in said slot, a spring normally holding the latch with its inner end protruding into the recess of the hood, and a key-operated cam for withdrawing the latch from said recess, said plug being of sufficient length to clear the hood when depressed and to engage both socket and hood when in elevated position.

7. The combination with a pivotally mounted shift lever of a socket fixed with relation to the fulcrum for said lever, a plug closely fitting said socket and movable longitudinally of the lever, a recessed hood fixed upon the lever and adapted to fit closely about the upper end of said plug when the plug is moved outwardly of the socket, a cap screw-threaded into engagement with the hood, there being a horizontal slot formed in the hood and cap and opening into said recess, a latch notch in the plug positioned to aline with said slot during the elevated position of the plug, a latch slidably mounted in said slot, a spring normally holding the latch with its inner end protruding into the recess of the hood, a key-operated cam for withdrawing the latch from said recess, said plug being of sufficient length to clear the hood when depressed and to engage both socket and hood when in elevated position, and a cape formed about the lower rim of said hood to provide a cover for the plug in all positions of said lever.

In testimony whereof I have affixed my signature.

GOTTHARDT KOCH.